United States Patent

[11] 3,598,232

[72] Inventor Earl M. Trammell, Jr.
c/o E.M.T. Enterprises, Inc., P.O. Box 435,
St. Louis, Mo. 63166
[21] Appl. No. 875,753
[22] Filed Nov. 12, 1969
[45] Patented Aug. 10, 1971
Continuation-in-part of application Ser. No. 724,509, Apr. 26, 1968, now Patent No. 3,547,326, dated Dec. 15, 1970, which is a continuation-in-part of application Ser. No. 744,482, July 12, 1968, now Patent No. 3,526,314, dated Sept. 1, 1970, which is a continuation-in-part of application Ser. No. 791,940, Jan. 17, 1969, now Patent No. 3,504,830, dated Apr. 7, 1970.

[54] LITTER DISPOSAL UNIT IN AN AUTOMOBILE ASSEMBLY
14 Claims, 5 Drawing Figs.
[52] U.S. Cl. .................................................. 206/19.5 R,
224/29 D
[51] Int. Cl. ........................................................ B60n 3/08
[50] Field of Search ............................................ 206/19.5 R;
224/29 D, 42.42 A

[56] References Cited
UNITED STATES PATENTS
3,002,665  10/1961  Allen ........................... 224/42.42

1,920,393  8/1933  Jay ................................ 206/19.5 R

Primary Examiner—Leonard Summer
Attorney—Cohn and Powell

ABSTRACT: A utility device, such as a litter container or the like, is held against the front side of the automobile seat that is selectively adjustable in position forwardly, rearwardly, upwardly or downwardly. The mounting means connecting the container to the seat includes a key means that interfits guideways formed on the container rear wall and on a support plate located adjacent the container rear wall, the key means being slidably movable upon vertical adjustment of the container to accommodate the underseat height. Clamping means interconnects the support plate with a rearwardly facing shoulder formed on the bottom side of the seat adjacent the lower edge of the front seat side, whereby to hold the support plate and hence the container against the front side of the seat. Resilient means interconnects the support plate and the container and tends to urge the container downwardly. In one embodiment, the clamping means includes a pair of brackets interconnected by an adjustable fastener, one bracket being secured to the support plate and the other bracket engaging the shoulder. In another embodiment, the clamping means includes a flat coil spring having one end fixed to the support plate and the opposite coiled end engaging the seat shoulder to urge the support plate and container against the front seat side.

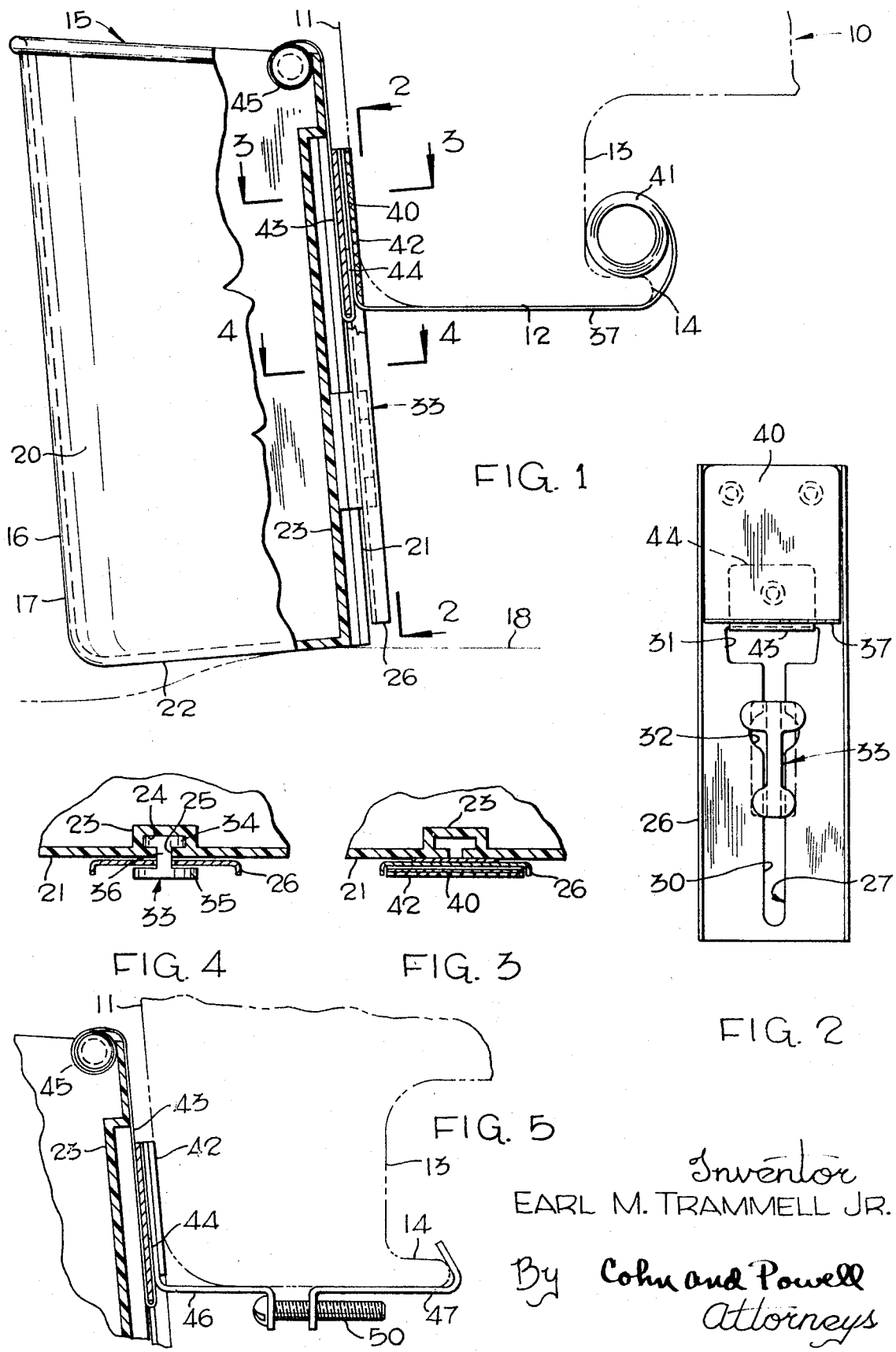

LITTER DISPOSAL UNIT IN AN AUTOMOBILE ASSEMBLY

CROSS-REFERENCE TO RELATED APPLICATIONS

This application is a continuation-in-part of copending applications, Ser. No. 724,509, filed Apr. 26, 1968, now Pat. No. 3,547,326, issued Dec. 15, 1970 Application Ser. No. 744,482, filed July 12, 1968 now U.S. Pat. No. 3,526,314, issued Sept. 1, 1970; and application Ser. No. 791,940, filed Jan. 17, 1969, now U.S. Pat. No. 3,504,830, issued Apr. 7, 1970.

BACKGROUND OF THE INVENTION

This invention relates generally to improvements in a litter disposal unit in an automobile seat assembly, and more particularly, to an improved means for mounting such container in a forwardly and rearwardly adjustable front seat.

The container can hold litter, driving accessories or any convenience items.

The heretofore conventional litter containers have either incorporated a gravity fit such as the common placement of a container across the transmission hump on the front seat floor, or have employed means for attaching the litter container to the dashboard, kick pad and so forth, of the automobile. These latter means of attachment necessitated different fixtures for each make of automobile. Also, both the gravity and fixed positions mentioned served to interfere at times with the movement of the driver and passenger. Litter containers have also been made in one piece with an integral hook that hooks under the front seat of the automobile to maintain a fixed position against the lower portion of the front seat. This is a desirable location since it is both accessible and out of the way of the seat occupants. However, there has been no general acceptance to date of this hook design since it is limited in practical attachment to the varying underseat structure.

Those devices which could be hung from internal projections were usually constructed inexpensively of paper so that they could be thrown away when filled and consequently were not readily available when a supply was depleted. Moreover, such containers are not convenient because they obstruct the use of the mounting projection and were usually located in an area where they interferred with the driver's or passenger's movements and actions.

Those containers which rested on the seat took up seating room and diminished the occupant's comfort.

Those containers which rested on the floor hindered the movement of the occupant's legs and were not always in the optimum position for usage, especially when utilized in conjunction with a movably mounted automobile front seat.

There are no general containers of this type that can be installed with a seat assembly as an accessory at minimal expense and yet achieve the desired functional advantages.

SUMMARY OF THE INVENTION

The present litter container is attached to an automobile seat at the front side by a special mounting means. The container is located under the occupant's legs near the floor so that the container does not hamper the movement of the occupant. The container is in a relatively concealed position, yet is readily available for usage. The container does not occupy important and otherwise usable seat or floor space.

This invention positions the litter container in this convenient position by new attachment means which permits practical and easy installation on a front seat structure of any automobile including those with power seats. It provides a pressure fit against the front seat regardless of the structure variance that exists from one make of automobile to another.

The litter disposal unit, including the unique mounting means, is simple and durable in construction, and inexpensive to manufacture and assemble. It can be quickly and easily installed in any automobile by anyone without the need for any complicated instructions or special tools. Accordingly, the unit is one that can be sold as an accessory and can be readily installed by the average automobile owner or user.

Because the litter container is retained to the front seat side by the mounting means, the container will be carried by the seat during selective adjustment of the seat position, and will therefore be maintained in the appropriate location at all times.

The mounting means enables an automatic up and down adjustment of the container to accommodate different heights when the seat is raised or lowered and to accommodate varying levels of automobile floors which affect the height position of the container when the seat is moved forward or backwards. The container is designed to receive the insertion of a slidable key which in turn permits installation of the container to a slotted support plate that can be clamped to the automobile seat. This combination structure provides for an adjustable installation fit to the variable height seats of all automobiles. The slotted support plate and a cooperating coil spring permits the container to adjust up or down automatically.

The automobile seat is provided with a rearwardly facing shoulder adjacent the lower edge of the front seat side. The mounting means selectively connected to the container includes a key means interfitting guideways formed on the rear container wall and on a support plate adjacent the container rear wall, whereby to interconnect the container and support plate, the key means being slidably movable upon vertical adjustment of the container to accommodate the underseat height. Clamping means interconnect the support plate with the bottom seat shoulder to hold the plate and the container against the front side of the seat. A resilient means interconnects the support plate and the container and tends to urge the container downwardly.

In one embodiment, the clamping means includes a pair of brackets interconnected by an adjustable fastener, one bracket being secured to the support plate and the other bracket engaging the seat shoulder. In another embodiment, the clamping means includes a flat coil spring having one end fixed to the support plate and the opposite coiled end engaging the seat shoulder, the spring loading urging the plate and the container against the front seat side. The coiled end of the spring seats on and is retained by a ledge that constitutes the seat shoulder.

A negator type spring can be employed because it will provide both a constant and predetermined pull or clamp regardless of the varying width of the underseat structure to which it is attached.

The resilient means, tending to urge the container downwardly, includes a flat coil spring having one end affixed to the support plate and the opposite coiled end selectively engaging the container. Again, this can be a negator type spring.

The key means has a slidable yet friction fit with the container guideway so as to be selectively affixed in a longitudinally adjusted position in the guideway to compensate for a particular underseat height. The key means being slidably movable in the plate guideway to accommodate changes in underseat height as the seat is moved.

BRIEF DESCRIPTION OF THE DRAWING

FIG. 1 is a side elevational view, partly in cross section, of an automobile seat assembly;

FIG. 2 is a rear view of the support plate taken on line 2-2 of FIG. 1;

FIG. 3 is a fragmentary cross-sectional view taken on line 3-3 of FIG. 1;

FIG. 4 is a fragmentary cross-sectional view taken on line 4-4 of FIG. 1; and

FIG. 5 is a fragmentary, side elevational view similar to FIG. 1, but illustrating a modified clamping means.

DESCRIPTION OF THE PREFERRED EMBODIMENTS

Referring now by characters of reference to the drawing, and first to FIG. 1, it will be understood that the seat assembly includes an automobile front seat 10 having a front side 11 and a bottom side 12. The bottom seat side 12 is provided with a rearwardly facing shoulder 13 that constitutes a part of a ledge 14. As is usual, the bottom side 12 of seat 10 is spaced slightly above the floor 18, and the floor is usually of a configuration to provide varying underseat heights as the seat 10 is moved rearwardly or forwardly.

The litter disposal unit generally indicated by 15 includes a container 16 preferably constructed of a plastic material. The container 16 includes a front wall 17 rounded at the corners and merging with sidewalls 20 to joint with a rear wall 21. The container 16 includes a bottom wall 22.

Provided on the rear container wall 21 is a substantially vertical guideway 23 which provides an elongate groove. The groove includes an enlarged groove portion 24 and a relatively narrow groove portion 25 opening to the rear of the container rear wall 21. The guideway 23 is closed at its top and is open at its bottom.

The mounting means for holding the container 16 to the seat 10 includes a channel support plate 26 that is provided with a guideway 27. The guideway 27 consists of an elongate slot 30 having a pair of longitudinally spaced enlarged slot portions 31 and 32. The support plate 26 is located adjacent the rear container wall 21 with the guideway 27 aligned vertically with the container guideway 23, and more particularly with the elongate slot 30 aligned with the elongate narrow groove portion 25.

A key means 33 interfits the guideways 23 and 27 to interconnect the container 16 and support plate 26. The key means 33 is slidably movable upon vertical adjustment of the container 16 to accommodate the underseat height. As is best seen in FIG. 4, the key means 33 is of a generally I-shape having opposite heads 34 and 35 interconnected by a relatively narrow web 36. The key head 34 interfits the enlarged groove portion 24 of container guideway 23, while the web 36 extends through the relatively narrow groove portion 25 and the plate slot 30. The other key head 35 overlaps the body of support plate 26. The key means 33 has a slidable yet friction fit with the container guideway 23 so as to be selectively fixed in a longitudinally adjusted position in the guideway 27 to compensate for a particular underseat height. The key means 33 is slidably movable in the plate guideway 27 to accommodate for any changes in underseat height as the seat 10 is moved.

A clamping means interconnects the support plate 26 with the seat shoulder 13 to hold the container 16 against the front side 11 of seat 10. In this embodiment of FIG. 1, the clamping means includes a flat coil spring 37, that can be of a negator type, having one end 40 fixed to the top of the support plate 26 and having the opposite coiled end 41 seating on and retained by the ledge 14 and engaging the seat shoulder 13 to urge the support plate 26 against the front seat side 11. To assist in the attachment of the support plate 26, an adhesive pad 42 is secured to the rear side of the spring end 40 and engages the front seat side 11.

A resilient means, interconnecting the support plate 26 and container 16, tends to urge the container 16 downwardly so that the bottom wall 22 engages the floor 18 in all adjusted positions of the seat 10. The resilient means includes a flat coil spring 43, that can be of a negator type, having one end 44 fixed to the support plate 26 and having the opposite coiled end 45 selectively placed over and engaging the top rear edge of container 16, the spring 43 tending to urge the container 16 downwardly.

To install the mounting means, the support plate 26 is first connected to the seat 10. The coiled spring end 41 of spring 37 is placed on the seal ledge 14 against the seat shoulder 13, and the spring 37 is extended so that it lies flat against the seat bottom side 12 and the top of support plate 26 is located against the front seat side 11. The adhesive pad 42 secures the top of support plate 26 to the front seat side 11 and the loading of spring 37 holds the support plate 26 in position.

Then the key means 33 is located in the container guideway 23 and in an appropriate position. More particularly, the key head 34 is inserted through the open bottom end of guideway 23 into the enlarged groove portion 24 and the key web 36 is located in the relatively narrow groove portion 25. The key means 33 is slidably moved upwardly into the container guideway 23 until it is located at a position approximately midway of the distance between the bottom seat side 12 and the floor 18. Because the key means 33 has a friction fit with the container guideway 23, the key means 33 will be securely held in this adjusted position.

To connect the container 16 to the support plate 26, the key head 35 is aligned with the enlarged slot portions 31 and 32 so that the key web 36 interfits the plate slot 30. As the key web 36 moves downwardly into the plate slot 30 and the key head 35 is misaligned with the enlarged slot portions 31 and 32, the key means 33 and hence the container 16 is secured to the support plate 26. Then the coiled end 45 of spring 43 is extended and slipped over the top rear edge of container 16 so that the spring 43 tends to urge the container 16 downwardly to hold the container bottom wall 22 against the floor 15.

As the seat 10 is adjusted rearwardly or forwardly, the container 16 will slide over the floor 18 and follow its contour. Because the spring 43 urged the container 16 downwardly, the key means 33 will slidably move in the plate slot 30 to enable the container 16 to be adjusted in vertical height to automatically adjust for any differences encountered in the underseat height.

To disassemble the container 16 for the purpose of emptying or cleaning the container 16, the coiled spring end 45 is simply unhooked from the top rear edge of container 16, and the container 16 is raised slightly to align the key head 35 with the enlarged slot portions 31 and 32 so that the key means 33 can be simply disengaged from the support plate 26. The support plate 26 will remain in its secured position ready for reassembly of the container 16 in the manner previously described.

FIG. 4 illustrates another embodiment of the clamping means. This species of clamping means includes a pair of L-shaped brackets 46 and 47 interconnected by a threaded fastener 50. One of the brackets 46 is fixed to the top of the support plate 26 while the other bracket 47 is selectively hooked on the ledge 14 and engages the seat shoulder 13. By threadedly tightening the fastener 50, the brackets 46 and 47 are drawn together in a direction toward each other to clamp the support plate 26 tightly against the front seat side 11.

I claim as my invention:

1. In an automobile seat assembly;
    a. an automobile seat having a front side and a bottom side the bottom side being provided with a rearwardly facing shoulder adjacent the lower edge of the front side,
    b. a convenience container provided with a first guideway on its rear wall, and
    c. mounting means connected to the container, the mounting means including:
        1. a support plate adjacent the container rear wall, the plate being provided with a second guideway aligned with the first guideway,
        2. a key means interfitting the guideways to interconnect the container and support plate, the key means being slidably movable upon vertical adjustment of the container to accommodate the underseat height, and
        3. clamping means interconnecting the support plate with the seat shoulder to hold the container against the front side of the seat.

2. An automobile seat assembly as defined in claim 1, in which:
    d. resilient means interconnects the support plate and container and tends to urge the container downwardly.

3. An automobile seat assembly as defined in claim 1, in which:
    d. the clamping means includes:

1. a first bracket secured to the support plate,
2. a second bracket engaging the seat shoulder, and
3. an adjustable fastener interconnecting the brackets to clamp the seat between the brackets.

4. An automobile seat assembly as defined in claim 1, in which:
   d. the clamping means includes a flat coil spring having one end fixed to the support plate and the opposite coiled end engaging the seat shoulder to clamp the seat between the support plate and the coiled spring end.

5. An automobile seat assembly as defined in claim 4, in which:
   e. the seat shoulder includes a ledge, and
   f. the coiled end of the spring hooks over the ledge.

6. An automobile seat assembly as defined in claim 4, in which:
   e. the coil spring is of a negator type providing a constant and predetermined loading regardless of the distance between the front seat side and seat shoulder.

7. An automobile seat assembly as defined in claim 1, in which:
   d. a flat coil spring has one end fixed to the support plate and has the opposite coiled end engaging the container and tending to urge the container downwardly.

8. An automobile seat assembly as defined in claim 7, in which:
   e. the coil spring is of a negator type providing a constant and predetermined loading regardless of the varying underseat seat height.

9. An automobile seat assembly as defined in claim 1, in which:
   d. the key means has a slidable, yet friction, fit with the container guideway so as to be selectively fixed in a longitudinally adjusted position in the guideway to compensate for a particular underseat height, the key means being slidably movable in the plate guideway to accommodate any changes in underseat height as the seat is moved.

10. An automobile seat assembly as defined in claim 1, in which:
    d. the seat shoulder includes a ledge,
    e. the clamping means includes a flat coil spring having one end fixed to the support plate and having the opposite coiled end hooked over the ledge to urge the support plate against the front seat side, and
    f. a flat coil spring has one end fixed to the support plate and has the opposite coiled end engaging the container and tending to urge the container downwardly.

11. An automobile seat assembly as defined in claim 1, in which:
    d. the container guideway is an elongate groove having an enlarged portion and a narrow portion,
    e. the plate guideway is an elongate slot substantially aligned with the narrow groove portion of the container guideway, and
    f. the key means has opposite heads interconnected by a relatively narrow web, one key head interfitting the enlarged groove portion of the container guideway, the web extending through the narrow groove portion of the container guideway and the plate slot, and the other key head overlapping the plate to interconnect the container and plate.

12. An automobile seat assembly as defined in claim 11, in which:
    g. the said one key head has a slidable, yet friction, fit with the container in the enlarged groove portion of elongate container groove so as to be selectively fixed in a longitudinally adjusted position in the container groove to compensate for a particular underseat height, the key web being slidably movable in the plate slot to accommodate for any changes in underseat height as the seat is moved.

13. An automobile seat assembly as defined in claim 1, in which:
    d. resilient means interconnects the support plate and the container and tends to urge the container downwardly,
    e. the key means has a slidable, yet friction, fit with the container guideway so as to be selectively fixed in a longitudinally adjusted position in the guideway to compensate for a particular underseat height, the key means being slidably movable in the plate guideway to accommodate for changes in underseat height as the seat is moved.

14. An automobile seat assembly as defined in claim 1, in which:
    d. a flat coil spring has one end fixed to the support plate and has the opposite coiled end engaging the container and tending to urge the container downwardly,
    e. the container guideway is an elongate groove having an enlarged portion and a narrow portion,
    f. the plate guideway is an elongate slot substantially aligned with the narrow groove portion,
    g. the key means has opposite heads interconnected by a relatively narrow web, one key head having a slidable, yet friction, fit with the container in the enlarged groove portion, the web extending through the narrow groove portion and the plate slot, and the other key head overlapping the plate, the key web being slidably movable in the plate slot to compensate for any changes in underseat height as the seat is moved.